June 29, 1926.
D. W. MERRILL
CABLE OPERATED LOGGING CART
Filed Sept. 25, 1922
4 Sheets-Sheet 1
1,590,308
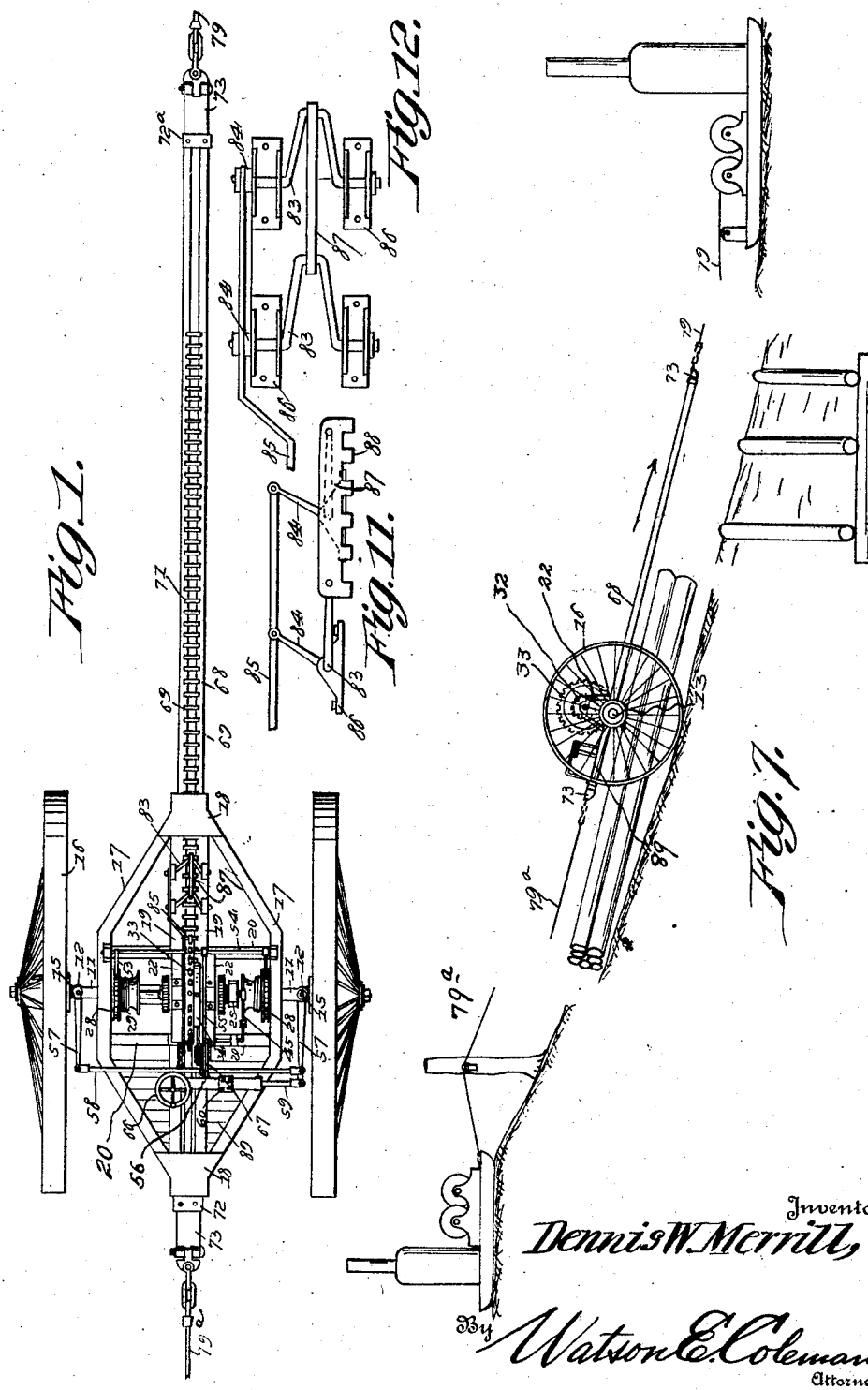

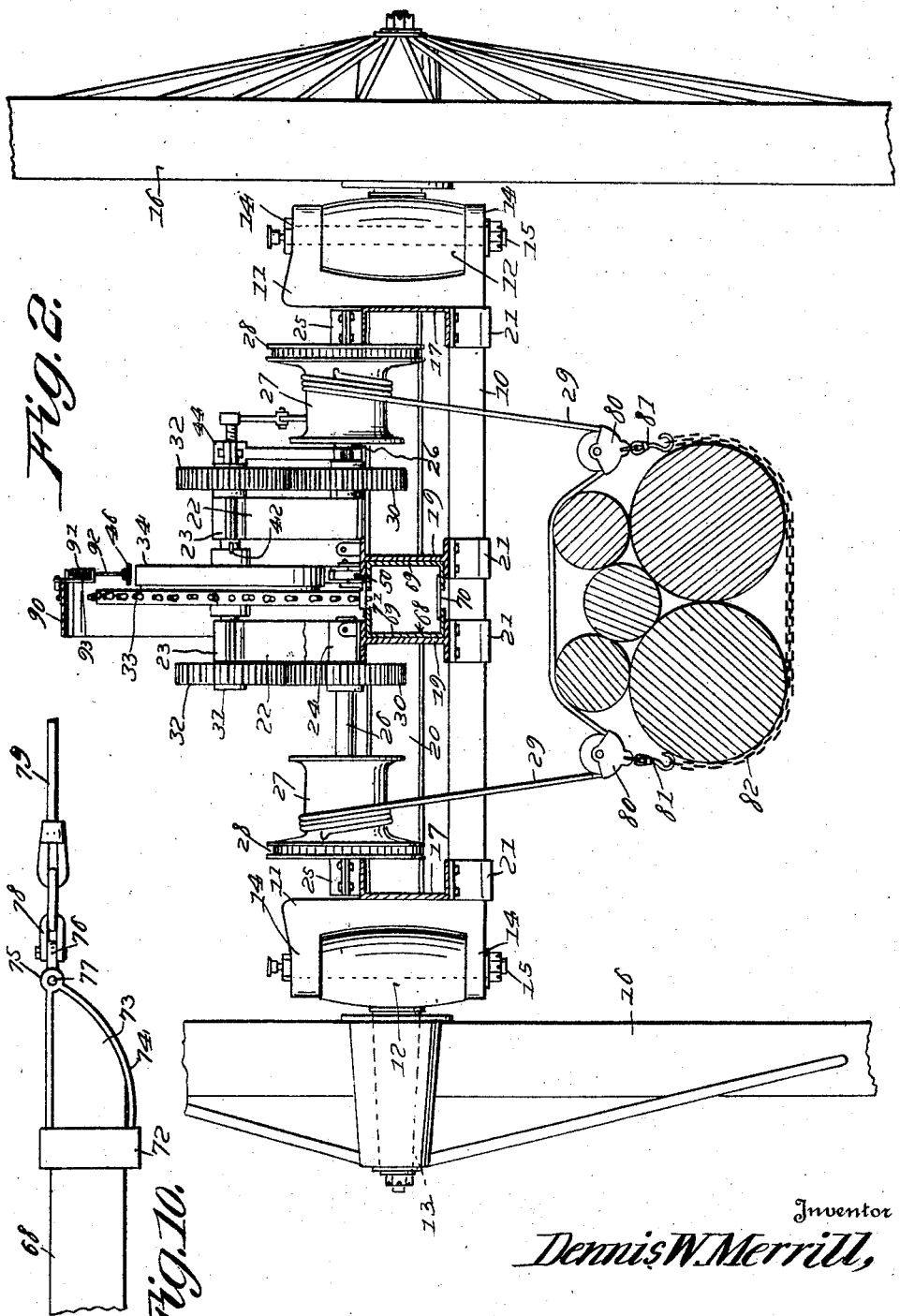

June 29, 1926.
D. W. MERRILL
1,590,308
CABLE OPERATED LOGGING CART
Filed Sept. 25, 1922
4 Sheets-Sheet 3
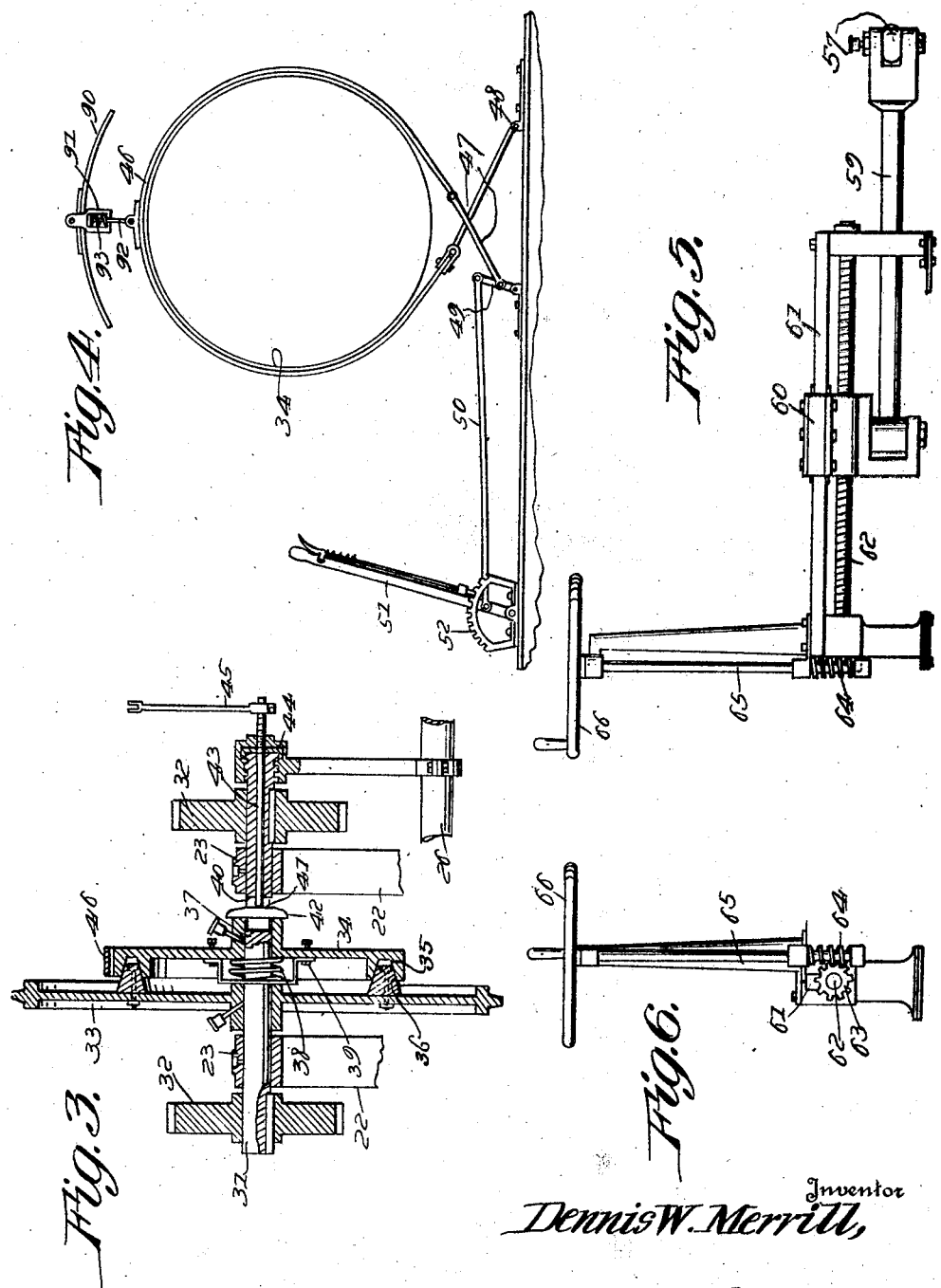

June 29, 1926.
D. W. MERRILL
CABLE OPERATED LOGGING CART
Filed Sept. 25, 1922
1,590,308
4 Sheets-Sheet 4
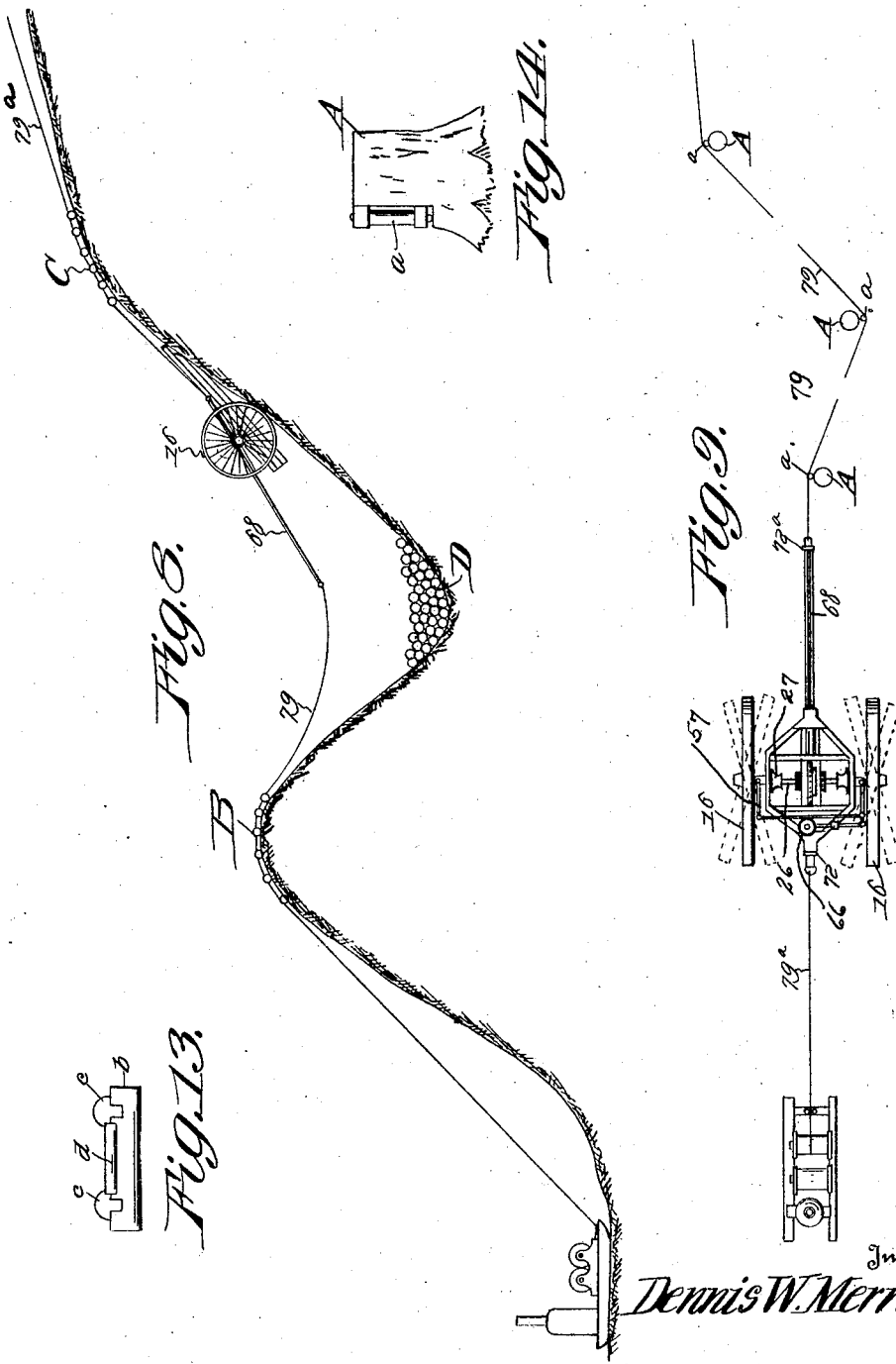

Patented June 29, 1926.

1,590,308

UNITED STATES PATENT OFFICE.

DENNIS W. MERRILL, OF ALBANY, OREGON.

CABLE-OPERATED LOGGING CART.

Application filed September 25, 1922. Serial No. 590,467.

This invention relates to carts, and particularly to carts designed for use in logging timber.

One of the objects of this invention is to provide a logging cart so constructed that it may be operated in either direction by cables operatively connected to the logging cart and to either one of a pair of donkey engines, thus permitting the cart to be drawn from the landing donkey engine to the woods or back again without requiring the turning around of the cart.

A further object is to provide a logging cart which is adapted to log timber of all sizes and lengths on all kinds of ground, excepting where the surface is extremely steep or obstructed by rocky cliffs, and which is particularly adapted to logging small timber at a profit by the use of donkey engines.

A still further object is to provide a cart which may be operated over the natural surface of the ground, eliminating the necessity of constructing wagon roads, skid roads, pole roads, chutes, railway spurs or sky lines, the cart being so constructed that it will roll over any ordinary obstruction without taxing the power of the donkey engine to any great degree and, therefore, making it unnecessary to cut away any small brush or thickets.

Another object is to provide a cable operated logging cart having steering wheels adapted to be shifted for steering purposes by the operator on the cart, thus providing means whereby the cart is prevented from skidding sidewise when operating on the side of sloping ground but instead holding the cart to the proper line of travel, this steering control thus given to the operator of the cart making it possible to turn the cart at angles to the regular line of travel, as for instance where the cart is operating on the top of a ridge which is not perfectly straight or where the cart has to be guided away from the line of travel for the purpose of taking on a load of logs.

Still another object is to provide means whereby the power exerted through the cables from the donkey engines may be used to clamp and lift the load of logs so that the forward ends of the logs are off the ground.

A still further object is to provide a cart of this construction which may be used not only for carrying loads to or from the landing but which may be also used for pulling stumps and clearing logged land.

Another object is to provide a logging cart having the hoisting drums and shiftable tongue above described and having means whereby power may be transmitted from the tongue to the hoisting drums or not as desired by the operator, provide means whereby the hoisting drums may be held in any adjusted position, and provide brakes, steering mechanism and tongue locking means all under the control of the operator standing on a suitable platform on the cart.

Other objects will appear more fully hereinafter.

My invention is illustrated in the accompanying drawings, wherein:—

Figure 1 is a top plan view of a logging cart constructed in accordance with my invention;

Figure 2 is a vertical section therethrough, the wheels and axle being shown in elevation;

Figure 3 is a vertical sectional view through the shaft 31 and wheels and clutch mounted thereon;

Figure 4 is a side elevation of the clutch showing the brake and guard;

Figure 5 is a side elevation of part of the steering mechanism;

Figure 6 is an end elevation of the construction shown in Figure 5;

Figure 7 is a diagrammatic view showing the logging cart in use;

Figure 8 is an exaggerated diagrammatic view illustrating the manner in which the logging cart is operated when passing through hills and valleys;

Figure 9 is a diagrammatic top plan view illustrating the manner in which the logging cart must be steered to pass obstructions;

Figure 10 is a side elevation of one end of the tongue;

Figure 11 is a side elevation of the tongue locking means;

Figure 12 is a top plan view of the tongue locking means;

Figure 13 is a detailed elevation of a portion of the pole road illustrated in Figure 8;

Figure 14 is a view of one of the stumps A shown in Figure 9 with the roller a.

Referring to the drawings, and particularly to Figures 1 to 5, it will be seen that my logging cart includes a transversely-medially disposed axle, designated 10, each end of this axle being upwardly extended, as at 11, to provide a hanger for the support of a body 12 of a wheel spindle. 13, this body 12 being pivotally supported between the outwardly projecting lugs 14 of the hanger 11 by means of the usual spindle-bolt or equivalent device 15. Carried upon the spindles 13 are the wheels 16. I have not attempted to illustrate the detailed construction of these wheels, but ordinarily the minimum diameter of the wheels will be about sixteen feet and the longest diameter will be about twenty feet.

Mounted upon the axle is a frame which includes the longitudinally extending side bars 17 which are channel-shaped, as illustrated in Figure 2, these side bars being parallel to each other forward and rearward of the axle and then converging toward each other both forward and rearward, these converging ends of the side bars being engaged by the gusset plates 18 riveted thereto or being connected in any suitable manner. Extending from front to rear of the machine just above the axle 10 is a tongue guide composed of two oppositely disposed I-beams 19, the flanges of which are spaced from each other so as to leave a medially disposed slot between these I-beams. These I-beams are connected to the beams 17 by the transverse braces 20, which may be of channel iron or have the form of I-beams, and which have their flanges riveted, bolted or otherwise engaged with the flanges of the channel irons 17. The axle 10 is engaged with the base flanges of the I-beams 19 and with the base flanges of the channel irons 17 by means of clamps 21 of any suitable or approved construction. I do not wish to be limited to the details of the frame so far described.

Mounted upon the braces 20 and extending longitudinally in parallel relation are the two bearing stands, one of which is illustrated in Figure 7 and designated 22, which is so constructed as to provide upper bearings 23 and lower bearings 24. These bearings may be of any suitable character and I have illustrated them conventionally. Immediately in line with the bearings 24 and mounted upon the upper flanges of the channel irons 17 are the bearings 25. Disposed in these bearings 24 and 25 are the hoisting drum carrying shafts 26, there being two of these shafts independent of each other. Each shaft carries upon it a hoisting drum 27 of conventional form having the usual ratchet ring 28. A cable 29 is attached to each drum and wound thereon. Carried upon the hoisting drum shafts are the gear wheels 30. Mounted in the upper bearings 23 of the bearing stands 22 is a transversely extending shaft 31 which carries upon it the gear wheels 32 which mesh with the gear wheels 30. Also mounted upon this shaft 31 is a loose gear wheel 33, and mounted for sliding movement upon the shaft but rotating therewith is a friction clutch 34 having a clutch face 35 which engages with a clutch face 36 on the gear wheel 33. The hub of this friction clutch 34 is many-sided in cross section and fits on the many-sided portion 37 of the shaft 31 and has sliding movement thereon.

A coiled compression spring 38 acts to urge the clutch away from the sprocket wheel 33. This outward movement of the clutch, however, is limited by the bolts 39 which engage the clutch 34 and engage a flange 40 carried upon the shaft 31. The shaft 31 is transversely slotted, as at 41, and mounted in this slot is a transverse key 42 which bears against the hub of the friction clutch. When this key is moved in one direction the friction clutch is forced into engagement with the sprocket wheel and when the key is moved in the opposite direction the spring 38 forces the friction clutch out of engagement with the sprocket wheel. The key 41 is shifted by means of a rod 43 extending longitudinally through one end of the shaft 31, this rod being screw-threaded at one end and engaging in the screw-threaded end of a bearing cap 44, and as this rod is turned in one direction it is obvious that the rod will be forced inward and when turned in the opposite direction that it will be drawn outward. The rod is provided with an arm 45 whereby the rod may be oscillated. The controlling means for the arm 45 will be later described.

The periphery of the friction clutch is adapted to be engaged by a brake band 46, the ends of this brake band being connected by cross links 47, one of these links being operatively connected to the frame, as at 48, and the other pair of links having formed with them an outwardly projecting lever 49 connected by a rod 50 to a brake-applying lever 51 operating over a sector 52 and having the usual hand operated lock engaging this sector. The ratchet rings 28 have dogs 53 coacting therewith, these dogs being mounted upon a shaft 54 having an arm connected by a rod 55 to a controlling lever 56 operating over a sector and having the usual hand operated locking device therefor. This ratchet lever 56 is disposed forward in convenient position to the operator.

Each steering knuckle or body 12 is provided with a steering arm 57, the steering arms being connected by the rod 58 and one of the steering arms has extending from it a connecting rod 59 which is pivotally engaged with a cross head 60. This cross head operates upon a transversely extending guide bar 61 and has a screw-threaded bore through which passes the screw 62. This screw is mounted in suitable bearings upon the frame of the machine and carries at one end the worm wheel 63 engaged by a worm 64 carried by a vertical steering post 65 having the usual steering wheel 66 at its upper end. By rotating the steering wheel in the desired direction great power may be exerted upon the connecting rod 59 to turn the steering wheels in the desired direction or hold them from oscillation. The lever 56 and the steering wheel are disposed in close relation to each other so as to be readily under the control of the operator. The arm 45 is connected by any suitable means to a lever 67 also disposed convenient to the operator and operating over a sector.

It will be seen that the steering control is geared down sufficiently to make it powerful enough to turn the large wheels for the purpose of guiding the cart. The ability to steer the cart is absolutely necessary to the successful operation of the cart. Without some means of steering, the cart would have a tendency to skid sidewise when operated along the side of sloping ground and there would be no means of holding the cart in the proper line of travel. Oftentimes it is necessary, as illustrated in Figure 9, to shift the cart so as to cause it to travel over an irregular course and away from the cable bearing on the stump or tree A. At a proper distance before arriving at a new turn the cart is steered away from the cable bearing and when the roadway is sufficiently clear so the cart can circle and clear the cable bearing support, the cart is then turned to travel on the new angle. This cable bearing is simply a roller $a$ mounted vertically upon the stump A. I have provided the diagrammatic view in Figure 9 in order to indicate the necessity of steering. Furthermore, this steering is a necessity in order that the cart may travel to one side or the other of what may be termed its normal course and in order to take up loads or pass around the heads of gulleys or along the top of a ridge.

Sliding between the longitudinally extending I-beams 19 and between the plates 18 which connect the ends of the frame is a tongue, designated generally 68, which tongue is illustrated in Figure 2 as formed of two channel irons 69 having their flanges confronting each other, the lower flanges being connected by a transversely extending plate 70 riveted thereto and the upper flanges being connected by transverse bars or lugs 71 riveted to the flanges, the intermediate portion of these bars being round in cross section. These lugs 71 are spaced apart just sufficiently to be engaged by the projecting lugs on the gear wheel 33 so that as this gear wheel 33 is rotated it will cause the tongue to move longitudinally, or as the tongue is moved longitudinally it will cause the rotation of the gear wheel and, through the friction clutch and the gears 32, the rotation of the drums 27. The forward and rear ends of the tongue are formed with stops 72 and 72$^a$ and forward of these stops are the heads 73, the under faces of these heads being upwardly and forwardly curved after the manner of a runner, as at 74, the forward ends of these heads terminating in a knuckle 75, and a coupling 76 is pivoted by a transverse bolt 77 to this knuckle and to this coupling is connected the shackle 78, which in turn is operatively connected to the cable 79.

There are two of these cables 79 and 79$^a$. The cable 79 extends to the drum of the donkey engine at the landing place, while the other cable 79$^a$ extends to the woods donkey engine. It will be obvious that when the cart is at the landing place and the tongue is projected toward the landing place donkey engine and the woods donkey engine is started up, that the tongue will be drawn longitudinally the full length of the cart and projected toward the woods donkey engine and vice versa.

As before remarked, the cable 29 has its ends attached to the drums 27 and wound thereon and the bight of this cable passes through the two blocks 80. Attached to these blocks 80 are the swivelled grab hooks 81 adapted to be connected to a chain 82 disposed beneath the logs and extending up on each side about two-thirds of the height of the load from the ground, the hoisting cable 29 being looped over the remaining one-third of the load. It will be seen that with this construction when the drums 27 are rotated in a direction to wind up the ends of the cable thereon that the bight of the cable will be drawn downward against the upper logs while the chain 82 will be drawn upward against the lower logs and thus a strong and efficient binding hold will be secured on the load when it is elevated free of the ground.

It will be obvious now, assuming that the clutch 34 is in engagement with the sprocket wheel, that when the tongue 68 is drawn in one direction longitudinally of the cart by means of the cables connected to the donkey engine that the sprocket wheel 33 will be rotated and through the gears power will be transmitted to the hoisting drums 27. Thus the power of the donkey engine is used to hoist the load and bind the cable 29 and chain 82 upon the load. When the tongue 68 has been drawn forward to its full extent one of the stops 72 or 72$^a$ will strike against the square frame formed by the plates 18 and the beams 17 and the movement of the tongue will be stopped. Then the power of the donkey engine, if still applied, will act to draw the cart over the ground. It will be seen that when the cart comes to a stop, the load is prevented from descending under its own weight by means of the ratchet dogs 53 engaging the ratchet rings 28, but that if it be desired to allow the load to descend these ratchet dogs are lifted and the cart comes to a stop, whereupon immediately the weight of the load will cause the reverse rotation of the hoisting drums. Of course, under these circumstances the friction clutch 34 is released.

Means should be provided for locking the tongue, and to this end I provide at one end of the frame a pair of transversely extending crank shafts, designated 83, and provided with the upwardly extending arms 84 to which a cable or connecting rod 85 is pivoted. The crank shafts are mounted in bearings 86 on the upper flanges of the I-beams 19 and the cranks support a longitudinally extending, toothed locking block 87, the under face of which is provided with a series of rectangular teeth 88 adapted to engage in the spaces between the lugs 71 and when so engaged hold the tongue from longitudinal movement. When this locking block is depressed into engagement with the teeth formed by the lugs 71, the tongue will be absolutely held from any longitudinal movement. When the locking block is raised the tongue may be shifted, as heretofore described. This tongue locking device is for permitting the use of any length of tongue that may be desired, in other words initially adjusting the tongue to project to any length within its range of movement from one end of the frame.

Preferably the platform 89 will be provided upon which the operator will stand adjacent the controlling levers and a railing will engage this space. Guards will also be put over the sprocket wheel and gears to insure the safety of the operator. A guard of this character is shown in Figure 2 and is designated 90 and illustrated as being supported by a yoke 91 and rod 92 fixed to the brake band 46 and extending into the yoke and carrying the compression spring 93. I have merely illustrated this fragmentarily in order to indicate the character of the guard which will be used around the sprocket wheel and the manner in which it will be mounted, and I have not illustrated the guards around the gear wheels as these guards form no part of my invention and any suitable protecting device might be used.

The purpose of this cart, as before generally stated, is to obtain a means for logging timber of all lengths on all kinds of ground, excepting where the surface is extremely steep or obstructed by cliffs. Where horses are used for drawing the timber out of the woods to the landing it is necessary to construct a skid road and this is relatively expensive, not only as regards its initial cost but even as regards its upkeep. Pole roads are also used for roading logs for distances under one and a half miles, but this requires extensions to the yarding limits of each portion or area to be logged and the maintenance cost is relatively large, particularly when used in connection with horses or tractors, as the "ride" of the log has to be peeled and the front end of the log sniped. Where trucks are used a relatively expensive truck road must be put down and the system cannot be operated in freezing weather. Successful tractor logging is limited to very small wooded areas and tractors are rarely used except for hauling logs and lumber over highways and prepared roads.

The purpose of my cart is to obtain a machine for logging timber of all sizes and lengths on all kinds of ground and without the necessity of building pole roads or sky lines along all or a greater portion of the route over which the logs are to be hauled.

It is most difficult under present circumstances to log small timber at a profit by the use of donkey engines and cables. All tracts of large timber have considerable small timber scattered over the tract and this under present conditions is either being wasted or logged at a loss. This loss is overcome by the use of the carts which I have devised, as when operating in small timber the cart can haul approximately as many thousand feet of small timber as it can that amount of large timber. By the use of one donkey engine in short haul logging or two donkey engines in long haul logging this cart can be operated over the natural ground, eliminating the necessity of constructing roads, skid roads, chutes, railroad spurs or sky lines. By cutting the timber close to the ground the stumps constitute obstructions over which the large wheels will very readily roll without taxing the power of the donkey engine to any great degree. It is also unnecessary to cut away any small brush or thickets, as the large wheels will roll right through and over this brush. On rough ground the cart will be used to haul timber to the landing place, while the yarding will be done by the regular yarding engine which will yard the logs out of the canyons and steep places to a convenient place on the ridge or long slope where the cart can pick up the loads that have been bunched by the yarder and haul the load to the landing at the mill, stream or railroad. On level or rolling ground, however, the yarding can be done with the cart.

In the operation of my system the donkey engine at the landing will have a cable coupled to the front end of the tongue and the woods donkey engine will have a cable coupled to the rear end of the tongue. Starting from the landing the woods donkey engine pulls the cart to the area being logged and when the cart is pulled astride the load of logs that have been yarded by the yarder the cart is ready to be loaded. The loading chain 82 is put under the load and hooked into the grab hooks 81 that are suspended from the steel blocks on the loading cable. The engine at the landing then places tension on the cable which draws the sliding tongue longitudinally relative to the cart. This operates the sprocket wheel and this with the clutch thrown in causes the hoisting drums to turn and elevate the load until the tongue stop at the rear end of the tongue contacts with the rear end of the cart frame. As soon as this occurs the cart is put in motion, or in other words as soon as the tongue has moved to a position where it can go no further forward the cart is put in motion.

It will be understood that the chain 82 is placed around the forward ends of the logs so that the rear ends of the logs rest upon the ground and travel thereon. On ground that is steep enough to allow the load to slide on the ground faster than the cable is pulling, the cart will be forced to slide forward relative to the tongue, which causes the sprocket wheel to turn backward and lower the logs so that they will drag sufficiently to stop the cart from travelling forward. The cable then pulls the tongue forward to the cart frame and again elevates the load sufficiently to start it in motion. On arriving at the landing place slack is given to the landing engine cable and the weight of the load causes the load to descend. The operator then releases the friction clutch and gives sufficient slack to unhook the chain 82 from the grab hooks and the chain is removed from underneath the load and hooked by the center into one of the grab hooks and the landing donkey pulls the tongue forward again and rewinds the holding cable and chain so it will not be in the way, while the cart returns to the woods. The brake band 46 is then set and the clutch released and the woods donkey engine then pulls the cart back to the timber area for another load.

Should it be necessary to haul a load toward the woods donkey engine, as for instance in hauling supplies or bunching a load of logs, the load is elevated in the same manner as before stated and then the hoisting drum ratchet holds the load in this position during the process of hauling. Should steep ground be encountered where the load would move the cart ahead on the tongue the landing donkey engine holds the load back to a normal speed and the tongue locking block 87 would keep the cart from running forward on the tongue. To operate the cart for yarding purposes or for a short haul by the use of one dnokey engine the return cable is run off to one side of the line of travel through a series of blocks and back to the coupling at the rear end of the tongue.

In Figure 8, I show the operation of my cart under conditions where the cables from the cart to the landing engine and to the woods engine pass over two hills with a relatively deep gulley between them. Under these circumstances the crests of these hills B and C are provided with pole roads, that is a road composed of transverse sleepers $b$, longitudinal logs $c$, and steel rollers $d$. These pole roads are well known and, therefore, require no special description. Their only purpose is to keep the cable off the ground where the cable passes over the crests of the hills. The gulley D should be filled with waste or wind fallen timber, as illustrated in the drawing. Under the conditions shown in this diagram, it will be necessary to have the tongue drawn toward the rear end of the cart and locked there until the cart reaches the log fill in gulley D. Then the tongue should be released as the cart is starting up the hill, the load being held up by the ratchet dogs 53, while the tongue is held back. This manner of operating will avoid cramping the tongue. The rails placed on the pole road allow the cable to operate freely and the pole road itself will protect the cable bearing from the dragging action of the load. One of the reasons why it is necessary to have the wheels of the cart dirigible is that should the cart have a tendency to skid when operating on the side of a slope the wheels can then be turned up enough to hold the cart on the direct line of travel.

It will be noted that the rims of the wheels are relatively wide for obvious reasons, but one of the reasons for making the rims wide is that when it is necessary to operate the cart up the bottom of a canyon or gulley the cart is operated at a slow speed for the first few trips until the wheels go into the banks of the gulley and form a road. It will be seen that this cart may be also used for the purpose of gathering together a bunch of logs to make a load. Under these circumstances a cable is used, when the choker cable which is engaged with one of the grab hooks on the cable 82 and the cable 82 is let out to any desired distance. The choker cable or skidding tongs are engaged with the logs to be bunched or gathered together and then the tongue of the cart is reciprocated by alternately operating the landing engine and the woods engine to cause the winding up of the cable 82 which will, of course, draw upon the choker cable or skidding tongs and open and draw the logs together into a bundle, after which the logs can be loaded, as previously described. The choker cable and skidding tongs are well known instrumentalities and it is not believed necessary to illustrate these devices but merely to indicate how the cart may be used for the purpose of gathering or bunching logs or drawing them into the line of travel of the cart where they may be afterwards picked up. The horse cart that is now in general use is pulled by four horses and weighs two tons. My donkey engine operated logging cart would weigh from six to ten tons and be operated by engine having forty to eighty horsepower. By hauling timber in long lengths my cart would handle approximately one car load for each trip and the average speed of operation would be about twice that of a horse cart. My cart permits the use of donkey engine operated cables but does away with the necessity of logging roads, skid roads or pole roads, except under certain relatively exceptional cases.

I claim:—

1. A cable operated logging cart comprising a wheeled frame, hoisting drums thereon, a hoisting cable having its ends disposed over the drums, a tongue mounted upon the frame for longitudinal shifting movement relative thereto and adapted to be connected at its ends to the operating cables, stops at the ends of the tongue and operating to limit the movement of the tongue in either direction and mechanism operated by the reciprocation of said tongue in one direction or the other for operating said drums to rotate the drums correspondingly in one direction or the other, said stops acting to cause the pull on the cable to draw the cart over the ground after the drums have been fully operated to raise the load.

2. A cable operated logging cart comprising a wheeled frame, hoisting drums thereon, a hoisting cable having its ends disposed over the drums, a tongue mounted upon the frame for longitudinal shifting movement relative thereto and adapted to be connected at its ends to the operating cables, stops on the ends of the tongue and operating to limit the movement of the tongue in opposite directions mechanism operated by the reciprocation of said tongue for operating said drums to rotate the drums in opposite directions, said mechanism including a manually operable means for connecting the drums with or disconnecting them from operative connection with the tongue, and manually operable means for holding the drums in any adjusted position against strain on the cable, said stops operating to cause the tongue to exert draft upon the cart when the tongue has been drawn to its limit in either direction and has fully operated the hoisting drums.

3. A cable operated logging cart comprising a wheeled frame, hoisting drums thereon, a tongue mounted upon the cart for longitudinal movement relative thereto and adapted to be connected at its opposite ends to operating cables, stops at opposite ends of the tongue limiting the movement of the tongue in opposite directions a member mounted upon the frame and rotated in one direction or the other by the reciprocation of the tongue in one direction or the other, and mechanism for transmitting the power of said member to the drums including a manually shiftable clutch, and manually operable means for holding the drums set in any adjusted position, said stops acting to exert draft upon the logging cart through the tongue when the tongue has been shifted fully in one or the other direction and has operated the hoisting drums.

4. A cable operated logging cart including a wheeled frame, hoisting drums thereon, a tongue mounted for longitudinal movement upon the wheeled frame and adapted to be connected at its ends to operating cables, stops on the opposite ends of the tongue limiting the movement of the tongue in either direction said tongue having teeth, a toothed wheel mounted on the frame with which the teeth on said tongue engage, a shaft upon which the toothed wheel is loosely mounted and having gear wheels operatively engaging the drums, a manually shiftable clutch whereby the toothed wheel may be engaged with said shaft or disengaged therefrom, and manually operable means for holding the drums against reverse movement under the action of a load, the stops on the tongue causing the tongue to exert draft strain upon the logging cart when the tongue has been shifted fully in either direction and has fully operated the winding drums.

5. A cable operated logging cart including a wheeled frame, hoisting drums thereon, shafts supporting the hoisting drums and having gear wheels, a tongue mounted for longitudinal movement relative to the wheeled frame and adapted to be connected at its opposite ends to operating cables, the tongue having teeth, stops on opposite ends of the tongue and limiting the movement of the tongue in opposite directions a toothed wheel with which the teeth engage, a shaft mounted upon the frame and upon which the toothed wheel is loosely mounted, gear wheels carried by the shaft and engaging the gear wheels on the drum shaft, a manually operable clutch for operatively engaging the toothed wheel with the shaft upon which it is mounted or disengaging it therefrom, and manually operable means for holding the drums in adjusted position against reverse movement, the stops on the tongue operating to cause strain to be exerated upon the cart when the tongue has been shifted in one or the other direction to its full extent and the winding drums have been fully operated.

6. A cable operated logging cart comprising a frame having opposite, medially disposed, manually dirigible wheels, manually operable means mounted on the frame for shifting said wheels, winding drums on the frame, a longitudinally extending tongue carried by the frame and longitudinally shiftable with relation thereto, guides at the forward and rear ends of the frame through which the tongues passes, the tongue being adapted to be connected at its forward and rear ends with cables, the tongue being provided at its end with stops limiting the movement of the tongue in either direction, manually operable means for operatively connecting the tongue with the winding drums or disconnecting it therefrom, and means for holding the winding drums against reverse movement, said stops causing the tongue to exert strain upon the cart to move the cart when the tongue has been fully shifted in either direction and has fully operated the winding drums.

7. A cable operated logging cart comprising a supporting frame, winding drums on the frame, an axle extending medially across the frame and having steering knuckles, supporting wheels mounted upon said steering knuckles, manually operable means for shifting the supporting wheels to steer the machine, guides mounted upon the forward and rear ends of the frame, a tongue longitudinally shiftable through said guides and having teeth, a shaft mounted upon the frame, a toothed wheel loosely mounted upon the shaft and engaging the teeth of the tongue, means for transmitting power from said shaft to the winding drums, a manually operable friction clutch adapted to engage the toothed wheel with said shaft or disengage it therefrom, a manually operable brake controlling the movements of the shaft, and manually controllable means for holding the drums from reverse movement.

8. A logging cart having two drums, a cable having its ends connected to the two drums and adapted to be wound thereon, a pair of hook supporting pulley blocks on the cable, and a chain connected at separated points to the hooks of the pulley blocks.

9. A logging cart having two drums, a cable having its ends connected to the two drums and adapted to be wound thereon, a pair of hook supporting pulley blocks on the cable, a chain connected at separated points to the hooks of the pulley blocks, a tongue mounted on the cart for longitudinal shifting movement thereto and adapted to be connected at its opposite ends to operating cables, and mechanism operated by said tongue for rotating the hoisting drum.

10. A cable operated logging cart including a wheeled frame, hoisting drum thereon, a tongue mounted upon the wheeled frame for longitudinal movement and adapted to be connected at its opposite ends to operating cables and having teeth, means mounted upon the frame and engageable with the teeth for locking the tongue against longitudinal movement, said means being manually shiftable into or out of engagement with the tongue including a toothed locking block, a pair of crank shafts upon which the block is carried, and manually controlled operating means connected to said crank shafts.

11. A cable operated logging cart comprising a wheeled frame, hoisting drums mounted thereon, a longitudinally extending tongue mounted upon the wheeled frame for longitudinal movement relative thereto and having teeth and adapted to be connected at its opposite ends to operating cables, a gear wheel mounted upon the frame and engaged by the teeth of the tongue, manually controlled means for transmitting the power of the toothed wheel to said drums, manually controlled means for holding the drums in adjusted position, and manually operable means engaging with said teeth for locking the tongue from longitudinal movement.

12. A logging cart comprising a supporting frame including longitudinal beams convergently inclined at their opposite ends, the frame being formed at its opposite ends to provide longitudinally extending guides, a transverse axle extending beneath the frame and disposed medially therof and formed with upwardly extending hangers at each end embracing the frame, knuckles pivoted for movement in a horizontal plane between said hangers and having outwardly extending spindles, supporting wheels mounted upon said spindles, a connecting rod between said knuckles, manually operable means for shifting said connecting rod to shift the wheels, winding drums mounted on the frame, a longitudinally extending tongue mounted in said guides and longitudinally shiftable with relation to the frame and adapted at its opposite ends to be connected to operating cables, frame supporting shackles mounted in bearings on the frame and having winding drums thereon, a cable wrapped upon the winding drums, manually controlled means for holding the winding drums in any adjusted position, a counter-shaft geared to the drum supporting shafts, a gear wheel loosely mounted upon the counter-shaft and having operative engagement with the tongue whereby when the tongue is reciprocated the gear wheel is rotated, and a manually operable friction clutch carried upon said counter-shaft and adapted to be shifted into or out of engagement with the gear wheel.

13. A logging cart comprising a supporting frame, a transverse, medially disposed axle upon which the frame rests, steering knuckles mounted upon the axle, manually operable means for shifting the steering knuckles, relatively large supporting wheels mounted upon the steering knuckles, hoisting drums mounted upon the frame, and cable operated means for drawing the cart in either direction and operating said hoisting means.

14. A logging mechanism including a logging cart having medially disposed wheels movable freely in either direction, winding drums mounted upon the cart, a tongue mounted upon the cart for longitudinal movement in either direction, mechanism operatively connecting said drums to the tongue and causing the rotation of the drums in one direction or the other by a corresponding movement of the tongue in one direction or the other and said mechanism including manually operable means for operatively connecting or disconnecting the tongue from the drums, operating cables connected to opposite ends of the tongue, stops on the opposite ends of the tongue limiting the movement of the tongue in either direction and acting, when the tongue has been fully shifted, to permit the cables to exert draft strain upon the logging cart, operating cables connected to opposite ends of the tongue, and power operated means remote from the cart for drawing said cables in either direction.

In testimony whereof I hereunto affix my signature.

DENNIS W. MERRILL.